(12) United States Patent
Kwon et al.

(10) Patent No.: US 7,773,107 B2
(45) Date of Patent: Aug. 10, 2010

(54) METHOD FOR SETTING MUTE FLAGS TO IMPROVE COMPATIBILITIES AND THE HIGH DEFINITION MULTIMEDIA INTERFACE SYSTEM USING THE SAME METHOD

(75) Inventors: Kwang Hun Kwon, Yongin-si (KR); Chang Hoon Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 477 days.

(21) Appl. No.: 11/704,262

(22) Filed: Feb. 9, 2007

(65) Prior Publication Data
US 2007/0200918 A1   Aug. 30, 2007

(30) Foreign Application Priority Data
Feb. 14, 2006   (KR) .................. 10-2006-0014375

(51) Int. Cl.
*H04N 7/14*   (2006.01)
*H04L 12/66*   (2006.01)
*H04L 12/28*   (2006.01)

(52) U.S. Cl. .................. 348/14.03; 370/352; 370/401

(58) Field of Classification Search .................. 370/241, 370/352, 401; 395/551; 348/14.03
See application file for complete search history.

(56) References Cited

U.S. PATENT DOCUMENTS

| 5,574,934 A * | 11/1996 | Mirashrafi et al. .......... 709/207 |
| 5,794,018 A * | 8/1998 | Vrvilo et al. ................ 713/400 |
| 6,341,195 B1 | 1/2002 | Mankovitz et al. |
| 2007/0055876 A1* | 3/2007 | Choi .......................... 713/170 |

FOREIGN PATENT DOCUMENTS

| EP | 1596592 A1 | 11/2005 |
| EP | 1624669 A2 | 2/2006 |
| EP | 1624669 A2 * | 2/2006 |

* cited by examiner

*Primary Examiner*—Derrick W Ferris
*Assistant Examiner*—Angel Brockman
(74) *Attorney, Agent, or Firm*—McKenna Long & Aldridge LLP

(57) ABSTRACT

The present invention relates to an HDMI (High Definition Multimedia Interface) system, and more particularly, to a method for setting mute flag in connection with transmission of audio data and auxiliary data transmitted through HDMI system, and an HDMI system using the same method.

19 Claims, 3 Drawing Sheets

METHOD FOR SETTING MUTE FLAGS TO IMPROVE COMPATIBILITIES AND THE HIGH DEFINITION MULTIMEDIA INTERFACE SYSTEM USING THE SAME METHOD

This present application claims priority under 35 U.S.C. 119 and 35 U.S.C. 365 to Korean Application No. 10-2006-0014375 (filed on Feb. 14, 2006), which is hereby incorporated by reference in its entirety.

BACKGROUND OF THE INVENTION

1. Field of the Invention

The present invention relates to an HDMI (High Definition Multimedia Interface) system, and more particularly, to a method for setting mute flag in connection with transmission of audio data and auxiliary data transmitted through HDMI system, and an HDMI system using the same method.

2. Description of the Related Art

HDMI is a standard for connecting a source device which sends data and a sink device which receives data, wherein the source device may be, for example, set-top box or DVD player and the sink device may be, for example, digital TV.

General architecture of HDMI system is suggested in "HDMI specification version 1.2a, FIG. 3-1 HDMI Block diagram", which is incorporated herewith as FIG. 1. Referring to FIG. 1 of the present invention, an HDMI system consists of a source device 100 which sends data and a sink device 200 which receives data. Each of source device and sink device may have more than one HDMI inputs and HDMI outputs. All the HDMI inputs at the source device and the sink device conform to the specification for the HDMI sink device, and all the HDMI outputs at the HDMI system conform to the specification the for HDMI source device.

As shown in FIG. 1, HDMI cable 300 employed in HDMI system holds four different channels, each of which consists of TDMS (Transition Minimized Differential Signaling) data channels 301, 302, 303 and clock channel 304. These channels are used for transmitting video data, audio data and auxiliary data. Also, HDMI system holds VESA (Video Electronics Standards Association) DDC (Display Data Channel) 400, which is used for exchanging configuration and status information between the single source device and the single sink device. Alternatively, HDMI system may use CEC (Consumer Electronics Control) line 500 which transmits CEC protocol to provide high level control among various viewing devices in user environment.

As described above, audio data, video data and auxiliary data are transmitted from HDMI sender 101 of the source device 100 to HDMI receiver 201 of the sink device 200 through three TMDS (Transition Minimized Differential Signaling) data channels 301, 302, 303 and video pixel clock is transmitted through TMDS clock channel 304. The video pixel clock is used as frequency standard for restoring data on three TMDS data channel 301, 302, 303 by receiver 201 of sink device 202.

The difference between traditional DVI (Digital Visual Interface) system and HDMI system is that audio data and auxiliary data as well as video data are transmitted through HDMI cable 300. Video data is transmitted as a series of 24 bit pixel on the three TMDS data channels and HDMI system employs packet structure for transmitting audio data and auxiliary data.

There is a packet type called General Control packet in HDMI specification version 1.2a (see table 3). The General Control packet was introduced in HDMI specification for muting audio and video signal simultaneously to reduce transient impacts between the source device and the sink device.

The General Control packet retains Clear_AVMUTE flag and Set_AVMUTE flag for muting or for releasing the muting of audio and video signal simultaneously. It is optional for the source device to send muting signal, but is required for the sink device to receive the signal for muting signal. Further, it is optional for the sink device to effectively process the received muting signal.

The reason HDMI system employs these mute flags are to minimize the transient impacts due to the status changes when the source device sends signals to the sink device. For example, it is possible to prevent audio pop noise which may occur in the source device by setting the AVMUTE flags.

When Set-AVMUTE flag is set in the source device, the sink device receives invalid video or audio signal. Accordingly, HDMI sink device can optionally perform the muting of video or audio signal as required.

Recently, most of home appliances are equipped with HDMI input/output terminals. Also, many high level functions (e.g. memory card operability) are increasingly added to set-top boxes or DVD players which meet the HDMI specification. Accordingly, the interoperability between the various source devices and the sink devices becomes an important issue.

More specifically, during transient period when resolution or frequency is being changed between the source device and the sink device, there may occur flickering or noise (hereinafter transient impacts). To prevent the transient impact, a technology to reduce transient impact of devices employing HDMI specification, or a technology to increase interoperability between devices is required.

The mute flags retained in the General Control packet of HDMI specification could be a solution to increase the interoperability between the source device and the sink device. Meanwhile, sometimes it is enough to simultaneously set Clear_AVMUTE flag and Set_AVflag to mute or release muting both audio signal and video signal (e.g. when the resolution is being changed), but at other times it is required to mute or release muting one of audio signal and video signal. For example, when playing back MP3 file from memory card which was added as a high level function or when changing frequency of MP3 file, more detailed control to selectively mute or release muting one of audio or video signal is desirable rather than to mute or release muting both of them. The need for more detailed control is increasing according to the high-end trend and diversification of source device and sink device.

SUMMARY OF THE INVENTION

Accordingly, an object of the present invention is to provide a HDMI system and a mute flag control method of the same that enable selective control of audio or video mute flag and reduce the transient impacts of related art in which one could not but mute or release muting of both audio and video signal, and to substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an HDMI system comprising a source device having a sender which sends at least one of video data, audio data and auxiliary data, cables passing the vide data, audio data and auxiliary data from the source device and a sink device having a receiver which receives the data from the source device, said audio data and auxiliary data being contained in GCP (General Control Packet) comprising: a packet header indicating the packet type; and a subpacket comprising at least one of single mute flags of audio mute flag and video mute flag and complex mute flag.

In a preferred embodiment, the audio mute flag comprises audio mute setting flag and audio mute clearing flag.

In a preferred embodiment, the video mute flag comprises video mute setting flag and video mute clearing flag.

In a preferred embodiment, the subpacket consists of 8 bytes, SB0 through SB7 which comprise the single mute flags and complex mute flags.

In a preferred embodiment, the subpacket consists of 8 bytes, SB0 through SB7, and the complex mute flag is contained in SB0 and single mute flags are contained in one of SB1 through SB7.

In a preferred embodiment, the source device is one of set-top box and DVD player, and the sink device is digital TV.

In another aspect of the present invention, there is provided a mute flag controlling method in an HDMI system comprising a source device having a sender which sends at least one of video data, audio data and auxiliary data, cables passing the vide data, audio data and auxiliary data from the source device and a sink device having a receiver which receives the data from the source device, said audio data and auxiliary data being contained in GCP (General Control Packet) comprising the steps of: requesting change of setting value in the source device; setting at least one of the audio mute setting flag and video mute setting flag in the source device; transmitting the set mute flag from the source device to the sink device; muting one of the audio signal or the video signal while playing the other; completing the request of changing setting value; setting mute clearing flag of one of the set mute flag; transmitting the set mute flag from the source device to the sink device; and releasing the mute of the audio signal or the video signal.

In a preferred embodiment, the audio mute flag comprises audio mute setting flag and audio mute clearing flag.

In a preferred embodiment, the video mute flag comprises video mute setting flag and video mute clearing flag.

In a preferred embodiment, the subpacket consists of 8 bytes, SB0 through SB7 which comprise the single mute flags and complex mute flags.

In a preferred embodiment, the subpacket consists of 8 bytes, SB0 through SB7, and the complex mute flag is contained in SB0 and single mute flags are contained in one of SB1 through SB7.

In a preferred embodiment, the source device is one of set-top box and DVD player, and the sink device is digital TV.

It is to be understood that both the foregoing general description and the following detailed description of the present invention is exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram of HDMI system specified by HDMI specification version 1.2a.

DETAILED DESCRIPTION OF THE INVENTION

Figure 1:
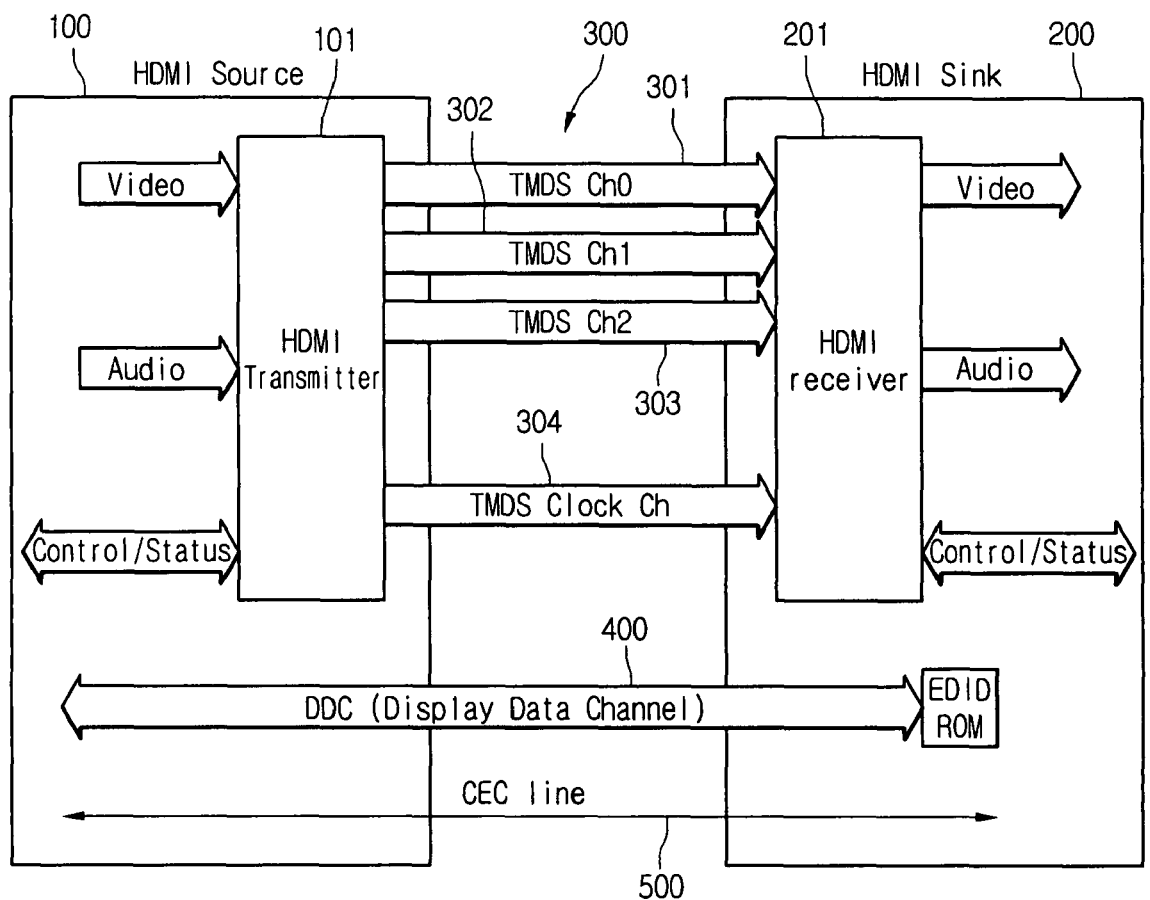

Reference will now be made in detail to the preferred embodiments of the present invention, examples of which are illustrated in the accompanying drawings. Wherever possible, the same reference numbers will be used throughout the drawings to refer the same or like parts.

In HDMI system, links for transmitting and receiving data between source device and sink device consist of Video Data Period, Data Island Period, and Control Period.

During the Video Data Period, active pixels of active video line are transmitted. During the Island Period audio data and auxiliary data are transmitted as a series of packets. Control Period is when there is no need to transmit video, audio or auxiliary data.

Among these, Data Island Period is related to the feature of the present invention, and during the Island Period packets of audio sample data and auxiliary data are transmitted. The auxiliary data comprise EIA/CEA-861B InfoFrames and other data describing active audio or video stream or source device.

The structure of Data Island Packet used in Data Island Period is as follows. All the data in one Data Island are included in 32 pixel packet. A packet consists of one packet header, packet body (which consists of four subpackets) and error correction bit. Each of the subpackets comprises 56 bit data, and is protected by 8 bit BCH ECC parity bits.

A packet header comprises 24 data bits and additional 8 bit BCH (32, 24) ECC parity bits. The parity bits are produced from 24 bits of packet header.

A packet header comprises 8 bit packet type and 16 bit packet specific data. Table 1 shows structure of packet header cited from Table 5-7 of HDMI specification 1.2a.

TABLE 1

Structure of packet header

| Byte | bit# 7 | 6 | 5 | 4 | 3 | 2 | 1 | 0 |
|---|---|---|---|---|---|---|---|---|
| HB0 | Packet type | | | | | | | |
| HB1 | Packet specific data | | | | | | | |
| HB2 | Packet specific data | | | | | | | |

As shown in Table 1, the first byte HB0 indicates packet type, the second byte and the third byte, HB1 and HB2 packet specific data.

TABLE 2

Example in which a certain packet type (General Control Packet) is designated (HDMI specification version 1.2 Table 5-16)

| Byte | bit# 7 | 6 | 5 | 4 | 3 | 2 | 1 | 0 |
|---|---|---|---|---|---|---|---|---|
| HB0 | | | | | | | 1 | 1 |
| HB1 | | | | | | | | |
| HB2 | | | | | | | | |

Table 2 shows packet type of HB0 is "3" in which bit 0 and bit 1 are "1" of the first byte, which indicates the packet type is General Control packet of one embodiment of the present invention.

TABLE 3

Packet type (HDMI specification version 1.2a Table 5-8)

| Packet Type Value | Packet Type |
|---|---|
| 0x00 | NULL |
| 0x01 | Audio Clock Generation (N/CTS) |
| 0x02 | Audio Sample (L-PCM and compressed formats) |
| 0x03 | General Control |
| 0x04 | ACP Packet |

TABLE 3-continued

Packet type (HDMI specification version 1.2a Table 5-8)

| Packet Type Value | Packet Type |
|---|---|
| 0x05 | ISRC1 Packet |
| 0x06 | ISRC2 Packet |
| 0x07 | 1 Bit Audio Sample Packet |
| 0x80+ InfoFrame Type | EIA/CEA-861B InfoFrame |
| 0x81 | Vendor-Specific InfoFrame |
| 0x82 | AVI InfoFrame* |
| 0x83 | Source Product Descriptor InfoFrame |
| 0x84 | Audio InfoFrame |
| 0x85 | MPEG Source InfoFrame |

As shown in Table 3, the difference of HDMI especially from DVI is that various Island packets such as Null, Audio Clock Regeneration (N/CTS), Audio Sample (L-PCM, compress formats) can be transmitted and received during Data Island Period. One packet type out of the various Island packets is General Control packet. The subpacket structure of General Control packet is shown in Table 4.

TABLE 4

General Control Subpacket (HDMI specification version 1.2a Table 5-17)

| Byte | bit# 7 | 6 | 5 | 4 | 3 | 2 | 1 | 0 |
|---|---|---|---|---|---|---|---|---|
| SB0 | 0 | 0 | 0 | Clear_AVMUTE | 0 | 0 | 0 | Set_AVMUTE |
| SB1 | 0 | 0 | 0 | 0 | 0 | 0 | 0 | 0 |
| SB2 | 0 | 0 | 0 | 0 | 0 | 0 | 0 | 0 |
| SB3 | 0 | 0 | 0 | 0 | 0 | 0 | 0 | 0 |
| SB4 | 0 | 0 | 0 | 0 | 0 | 0 | 0 | 0 |
| SB5 | 0 | 0 | 0 | 0 | 0 | 0 | 0 | 0 |
| SB6 | 0 | 0 | 0 | 0 | 0 | 0 | 0 | 0 |
| SB7 | 0 | 0 | 0 | 0 | 0 | 0 | 0 | 0 |

Subpacket of HDMI General Control consists of 7 bytes, SB0~SB6R as shown in Table 4, in which SB0 is presently used to include Set_AVMUTE flag in bit 0 and Clear_AVMUTE in bit 4. In other words, mute flags of General Control in prior art is complex mute flags for muting or releasing muting of both audio and video signal, and cannot but mute or release muting of both audio and video signal at the same time.

TABLE 5

Subpacket of General Control according to an embodiment of the present invention

| Byte | bit# 7 | 6 | 5 | 4 | 3 | 2 | 1 | 0 |
|---|---|---|---|---|---|---|---|---|
| SB0 | 0 | Clear_AMUTE | Clear_VMUTE | Clear_AVMUTE | 0 | Set_AMUTE | Set_VMUTE | Set_AVMUTE |
| SB1 | 0 | 0 | 0 | 0 | 0 | 0 | 0 | 0 |
| SB2 | 0 | 0 | 0 | 0 | 0 | 0 | 0 | 0 |
| SB3 | 0 | 0 | 0 | 0 | 0 | 0 | 0 | 0 |
| SB4 | 0 | 0 | 0 | 0 | 0 | 0 | 0 | 0 |
| SB5 | 0 | 0 | 0 | 0 | 0 | 0 | 0 | 0 |
| SB6 | 0 | 0 | 0 | 0 | 0 | 0 | 0 | 0 |
| SB7 | 0 | 0 | 0 | 0 | 0 | 0 | 0 | 0 |

As shown in Table 5, mute flags according to an embodiment of the present invention comprise single mute flags, Set_AMUTE, Clear_AMUTE, Set_VMUTE and Clear_VMUTE for controlling audio or video signal as well as complex mute flgas, Set_AVMUTE and Clear_AVMUTE for controlling audio and video signal at the same time.

In this configuration, assuming HDMI source device and HDMI sink device are connected and performing the playback of MP3, when bit 3, #2 of the first byte SB0 is set to 1 and sampling frequency of MP3 file is changed, transient impacts can be reduced by simply muting only audio signal. As such, it is not needed to mute both audio and video signals.

More specifically, when sampling frequency of audio signal is being changed, the sink device may produce negative impacts such as pop noises due to the change of internal clock. In this case, the source device sets Set_AMUTE flag to 1 not Set_AVMUTE flag, and the sink device mutes the audio signal while the source is performing the internal process for changing sample frequency. After the internal process is completes, the source device sets Clear_AMUTE to 1, and the sink device receives data in which Clear_AMUTE is set to 1. And then the sink device releases the muting of audio signal. In terms of mute control as above, that is, by selectively muting only audio signal (or only video signal as seeded), the transient impacts due to the change of sampling frequency, resolution and so on in connection with either of audio or video signal can be minimized.

In this embodiment, it is described the mute flags are located only in the first byte, SB0 of subpacket. However, the single mute flags such as AMUTE flag and VMUTE flag may be distributed in one or more bytes in the second byte through the eighth byte of subpacket while the complex mute flags such as AVMUTE are limited in the first byte.

Also, it is to be understood that the mute flags may be located in anywhere within the subpacket.

Figure 2:
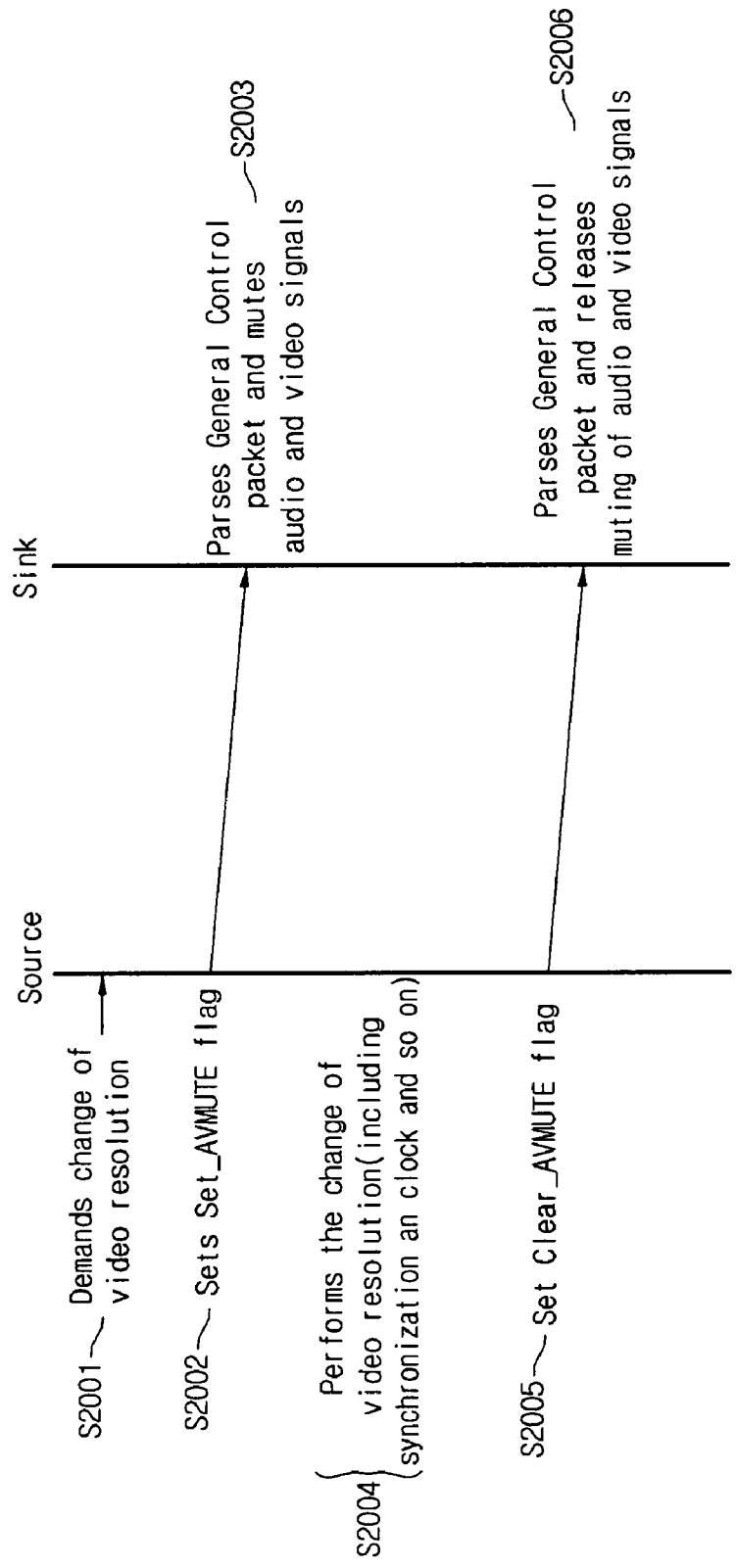
FIG. 2 shows flow of AVMUTE flag of General Control packet according to an embodiment of the present invention.
Figure 3:
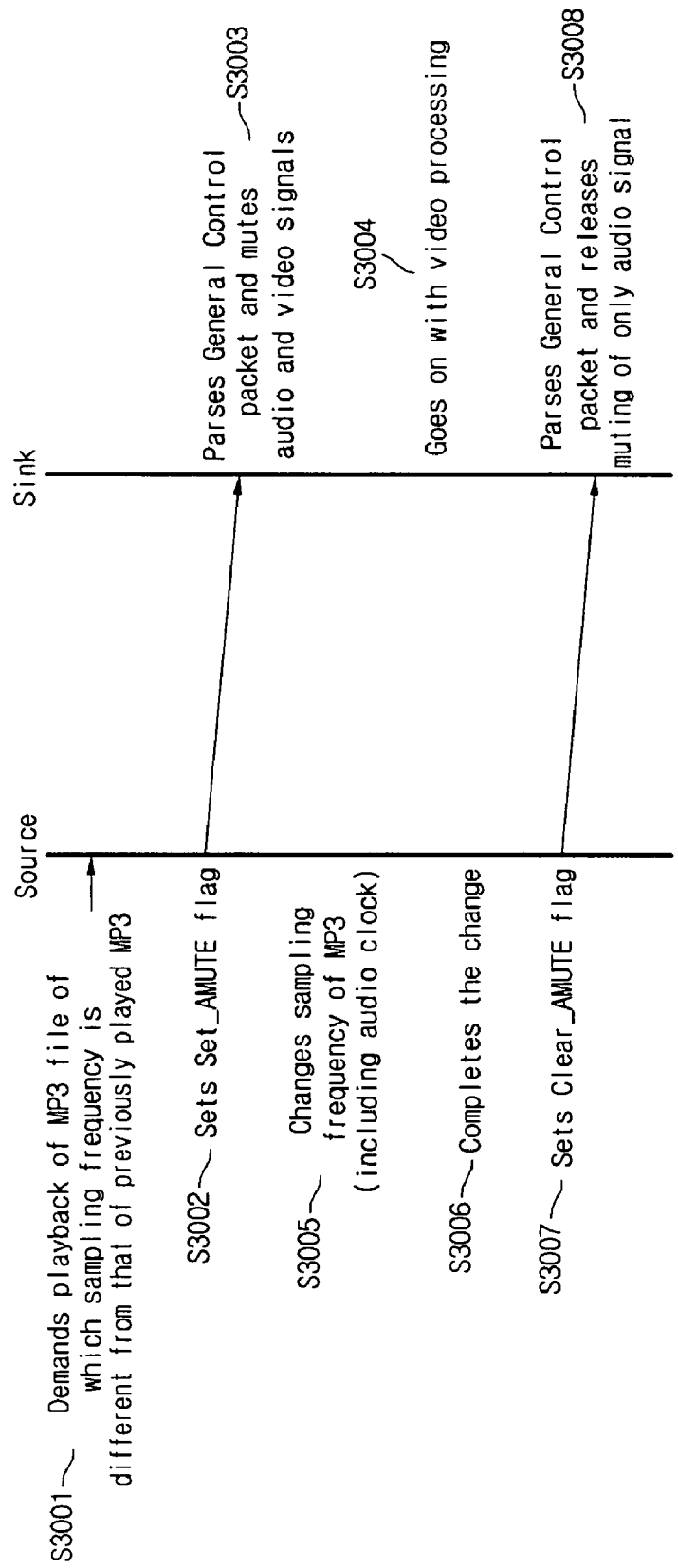
FIG. 3 shows flow of AMUTE flag of General Control packet according to an embodiment of the present invention.

FIG. 2 and FIG. 3 represent general transmission of AVMUTE flags and AMUTE flags of General Control packet between the source device and the sink device in HDMI system.

Referring to FIG. 2, transmission of AVMUTE flag is described as below.

When the source device demands resolution change S2001, it sets Set_AVMUTE flag "1" of complex mute flag retained in subpacket of General Control packet and sends General Control packet to sink device S2002. The sink device parses the General Control packet and mutes audio and video signal according to the Set_AVMUTE flag S2003. In the meantime, while audio and video signal is muted, the source device changes video resolution and other setting values including synchronization, clock and so on. After the change of the video resolution is completed, the source device sets Clear_AVMUTE flag of General Control packet and sends it to the sink device S2005. And then the sink device parses the General Control packet and releases the muting of the audio and video signal S2006.

Through the step as above, it is possible change video resolution by muting or releasing muting of both audio and video signals. However, it is desirable to set or clear single mute flags when it needs muting either one of audio and video signal.

FIG. 3 shows mute flag control method by muting and releasing muting of only audio signal.

Referring to FIG. 3, when the source device demands playback of an MP3 file which has different sampling frequency from that of the previously played MP3 file S3001, it sets Set_AMUTE flag of General Control flag which is a single audio flag to 1 and sends it to the sink device S3002.

The sink device receives the General Control packet and mutes audio signal according to the Set_AMUTE flag S3003. The source device changes sampling frequency of the MP3 file while the audio signal is muted. During the changing of sampling frequency, processes in connected with video signal go on S3004.

After the changing of sampling frequency is complete, the source device sets Clear_AMUTE flag to 1 of General Control packet and sends it to the sink device S3007. The sink device parses the General Control packet and releases the muting of audio signal S3008.

The steps of transmitting and receiving at least one of audio mute flag and video mute flag may be prescribed as a requirement in the HDMI specification. And the test and acknowledgment procedure for the steps of transmitting and receiving audio mute flag and video mute flag can be added to HDMI CTS (Compliance Test Specification).

It will be apparent to those skilled in the art that various modifications and variations can be made in the present invention. Thus, it is intended that the present invention covers the modifications and variations of this invention provided they come within the scope of the appended claims and their equivalents.

As is clear from the forgoing description, An HDMI system and mute flag controlling method according to the present invention have following advantages.

It is possible to properly meet the capricious situations which may occur during the communication between the source device and the sink device due to the functional high end trend and diversification thereof by selectively muting either audio or video signal as well as muting both audio signal and video signal in HDMI system.

An HDMI system and mute flag controlling method according to the present invention can reduce the transient impacts occurring during changing of system setting values, so that the interoperability between source device and sink device employing HDMI system can be enhanced and the fields which source device and sink device may be applied can be dramatically enlarged.

An HDMI system and mute flag controlling method according to the present invention can achieve the above advantages by means of simple manipulations of General Control packet without creating new configuration.

What is claimed is:

1. A source device that transmits data to a sink device using: High Definition Multimedia Interface (HDMI), comprising:
a transmitter for transmitting at least one of video data, audio data and auxiliary data to the sink device; and
a controller for controlling the source device to transmit a subpacket to the sink device in response to status change of the source device such that the sink device mutes either the video signal or the audio signal,
wherein the control subpacket contains flags, one mute flag for muting the audio signal and one mute flag for muting the video signal of the sink device.

2. The source device according to claim 1, wherein the single mute flag for audio signal comprises audio mute setting flag and audio mute clearing flag.

3. The source device according to claim 1, wherein the single mute flag for video signal comprises video mute setting flag and video mute clearing flag.

4. The source device according to claim 1, wherein the control signal comprises subpacket that consists of 8 bytes, SB0 through SB7.

5. The source device according to claim 1, wherein the control signal comprises complex mute flag which controls both of audio signal and video signal and the complex mute flag is contained in SB0 and single mute flag is contained in one of SB1 through SB7.

6. The source device according to claim 1, wherein the source device is one of set-top box and DVD player, and the sink device is a digital TV.

7. A mute flag controlling method in a source device that transmits data to a sink device using High Definition Multimedia Interface (HDMI) comprising the steps of:
   detecting status change of the source device;
   generating the subpacket for the sink device; and
   transmitting the subpacket to the sink device such that the sink device mutes either the video signal or the audio signal in response to the status change of the source device,
   wherein the subpacket contains mute flags, one mute flag for muting the audio signal and one mute flag for muting the video signal of the sink device,
   wherein the subpacket is generated at the source device in response to status change of the source device and contains mute flags, one mute flag for muting the audio signal and one mute flag for muting the video signal of the sink device.

8. The mute flag controlling method according to claim 7, wherein the single mute flag for audio signal comprises an audio mute setting flag and an audio mute clearing flag.

9. The mute flag controlling method according to claim 7, wherein the single mute flag for video signal comprises a video mute setting flag and a video mute clearing flag.

10. The mute flag controlling method according to claim 7, wherein the control signal comprises subpacket that consists of 8 bytes, SB0 through SB7.

11. The mute flag controlling method according to claim 7, wherein the control signal comprises complex mute flag which controls both of audio signal and video signal, and the complex mute flag is contained in SB0 and single mute flag is contained in one of SB1 through SB7.

12. The mute flag controlling method according to claim 7, wherein the source device is one of set-top box and DVD player, and the sink device is a digital TV.

13. The source device according to claim 12, wherein the source device is one of set-top box and DVD player, and the sink device is a digital TV.

14. A sink device that receives data from source device using High Definition Multimedia Interface (HDMI), comprising:
   a receiver for receiving at least one of video data, audio data, and auxilary data from the source device; and
   a controller for controlling the sink device to mute either the video signal or the audio signal when the receiver receives control subpacket from the source device,
   wherein the control subpacket is generated at the source device in response to status change of the source device, and contains flags, one mute flag for muting the audio signal and one mute flag for muting the video signal of the sink device.

15. The sink device according to claim 14, wherein the single mute flag for audio signal comprises audio mute setting flag and audio mute clearing flag.

16. The sink device according to claim 14, wherein the single mute flag for video signal comprises video mute setting flag and video mute clearing flag.

17. A mute flag controlling method in a sink device that receives data from a source device using a High Definition Multimedia Interface (HDMI), comprising the steps of:
   receiving a subpacket from the source device; and
   muting one of the video signal or audio signal according to the received subpacket,
   wherein the subpacket is generated at the source device in response to status change of the source device and contains mute flags, one mute flag for muting the audio signal and one mute flag for muting the video signal of the sink device.

18. The mute flag controlling method according to claim 17, further comprising:
   receiving a single mute flag for clearing either video signal or audio signal from the source device; and
   releasing the mute of the audio signal or the video signal according to the single mute flag.

19. The mute flag controlling method according to claim 17, wherein the source device is one of set-top box and DVD player, and the sink device is a digital TV.

* * * * *